United States Patent
Kim et al.

[11] Patent Number: 6,058,237
[45] Date of Patent: *May 2, 2000

[54] SIGNAL PROCESSING DEVICE ENABLING IMMEDIATE RECORDING OF A BROADCAST SIGNAL

[75] Inventors: Jeung Soo Kim, Kyungki-do; Hyung Jun Yoo; Myun Woo Lee, both of Seoul, all of Rep. of Korea

[73] Assignee: LG Electronics Inc., Seoul, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/635,191

[22] Filed: Apr. 19, 1996

[30] Foreign Application Priority Data

Apr. 21, 1995 [KR] Rep. of Korea ................ 95-9423

[51] Int. Cl.[7] .................................................. H04N 5/76
[52] U.S. Cl. .......................................... 386/46; 386/83
[58] Field of Search .................... 386/1, 46, 83; 348/731, 732, 733; 455/2, 140, 184.1; H04N 5/92, 5/91

[56] References Cited

U.S. PATENT DOCUMENTS

| | | | |
|---|---|---|---|
| 4,405,217 | 9/1983 | Brant | 352/84 |
| 5,479,267 | 12/1995 | Hashimoto | 386/83 |
| 5,517,256 | 5/1996 | Hashimoto | 386/83 |
| 5,523,851 | 6/1996 | Leshem | 384/46 |
| 5,526,127 | 6/1996 | Yonetani et al. | 386/83 |
| 5,526,130 | 6/1996 | Kim | 386/83 |
| 5,570,198 | 10/1996 | Cho | 386/46 |
| 5,625,423 | 4/1997 | Ito | 386/46 |
| 5,631,995 | 5/1997 | Weissensteiner et al. | 386/83 |
| 5,640,484 | 6/1997 | Mankovitz | 386/83 |

*Primary Examiner*—Thai Tran

[57] ABSTRACT

A signal processing device in a VCR that permits immediate recording includes a synchronous separator for separating a synchronous signal from a signal inputted from a television, a teletext decoder for detecting a broadcast source signal from the input signal, a microcomputer for recognizing the channel to which the television is tuned and outputting tuning data, and a tuner for adjusting the channel of the VCR to match the channel of the television, according to the tuning data from the microcomputer.

11 Claims, 6 Drawing Sheets

SIGNAL PROCESSING DEVICE ENABLING IMMEDIATE RECORDING OF A BROADCAST SIGNAL

BACKGROUND OF THE INVENTION

The present invention relates to a video cassette recorder (VCR), and more particularly to an immediate recording device and a method for recording broadcasting signal tuned by a tuner of the VCR immediately and easily.

FIG. 1 is an input signal converting circuit of the conventional VCR.

Generally, there are two methods for recording a broadcast signal with a VCR. First, a broadcast signal received through an antenna is directly recorded by the VCR. In this method, when the line/broadcast signal selecting switch $SW_2$ is switched broadcast signal input terminal RF and a tuner 1 of the VCR is controlled to select the desired channel, the broadcast signal is sent to and recorded in a recording unit through the line/broadcast signal selecting switch $SW_2$. Second, the line input signal which is inputted from the TV is recorded in the VCR. In this method, when the line/broadcast signal selecting switch $SW_2$ is switched to line signal input terminal AV, the line input signal $Av_{in}$ is recorded in the recording unit through the line/broadcasting signal selecting switch $SW_2$.

In order to watch a television (TV) program different from the TV program being recording by the VCR, the TV/VCR converting switch $SW_1$ in the VCR is switched to a TV mode so broadcast signal $RF_{in}$ is directly inputted to the TV set through the VCR. Thus, the user can watch the desired channel while a broadcast signal for a different channel is recording.

In the conventional recording device, however, the VCR must be turned on, the channel selector of the VCR must be set to the channel in which the broadcast signal is recording, and then a recording button must be operated to record the TV program that the user is watching, if the VCR is in an off state. Therefore, the VCR using the conventional recording device is inconvenient.

SUMMARY OF THE INVENTION

It is an object of the present invention to provide recording device in a video cassette recorder which can record a broadcast signal immediately and easily.

It is another object of the present invention to provide a method for immediately recording a broadcast signal with a video cassette recorder in which the receiving channel of the VCR is adjusted with the receiving channel of the TV set, using the broadcast source carried on the vertical blanking interval of the visual signal.

It is a further object of the present invention to provide a method for immediately recording a broadcast signal with a video cassette recorder in which the broadcast receiving channel is adjusted by comparing the broadcast signal inputted from the TV set with the broadcast signal inputted from the tuner of the VCR to coincide the receiving channel.

In order to achieve this object, the present invention comprises a synchronous separator which detects a visual signal and separates a synchronous signal from the visual signal, a teletext decoder which detects a broadcast source from the visual signal, a microcomputer for outputting a tuning data and controlling the deck system of the VCR, a tuner for tuning to a broadcast signal using the tuning data, and a luminance/color signal processing unit for processing the visual signal inputted from the tuner.

Further, the present invention comprises a tuner for tuning to a broadcast signal, a visual/audio signal separating unit separating the tuned signal into the visual and audio signals, a comparator which compares the audio signal inputted from the visual/audio signal separating unit with an audio signal inputted from the TV set and then outputs a comparison-judgement signal, a microcomputer for outputting a tuning data and controlling the tuner, and a luminance/color signal processing unit for processing the visual signal.

BRIEF DESCRIPTION OF THE INVENTION

DETAILED DESCRIPTION OF THE INVENTION

Hereinafter, the immediate recording device of the VCR according to the present invention is described in detail with FIG. 2–FIG. 6.

Figure 1:
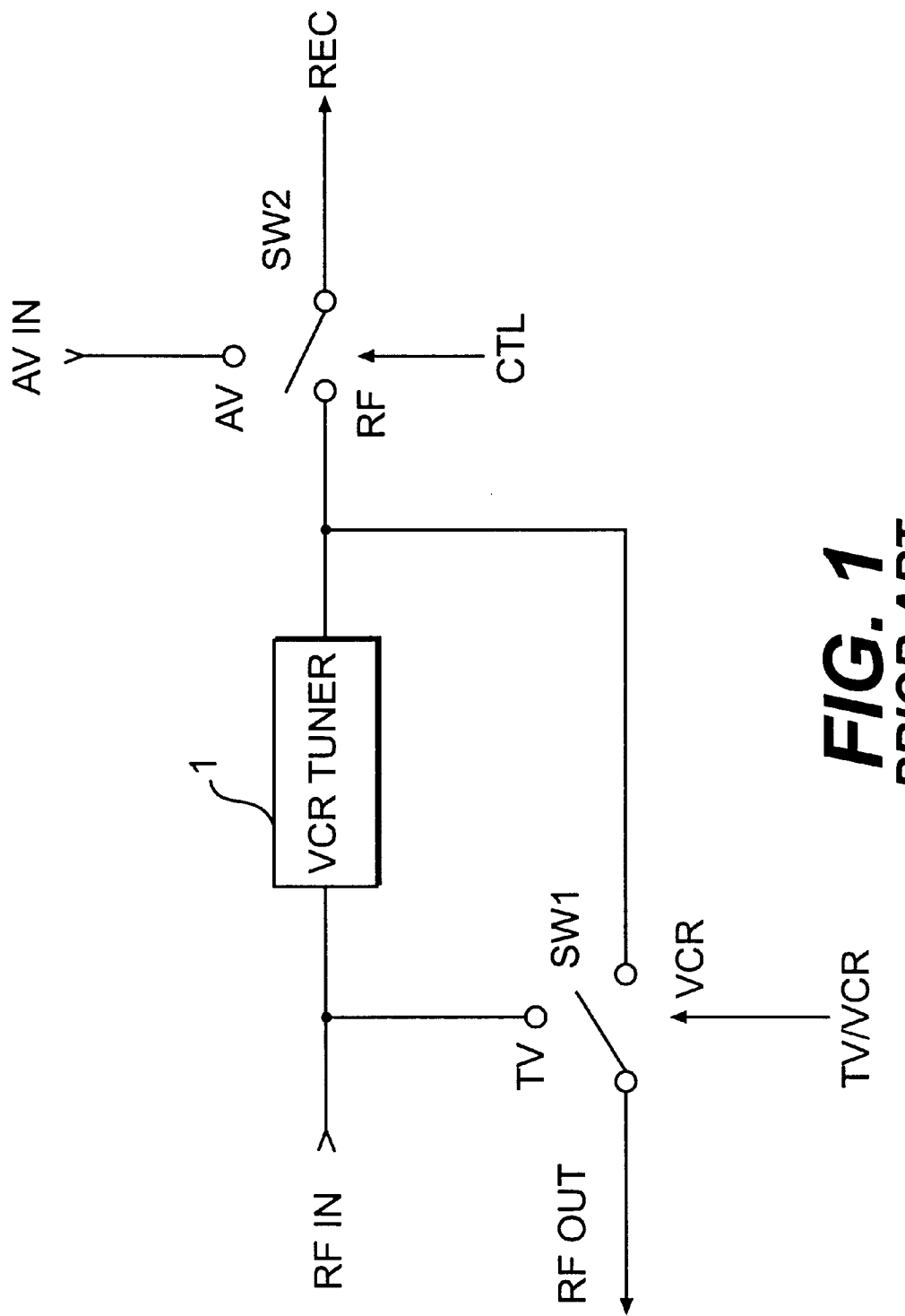
FIG. 1 is an input signal converting circuit of the conventional VCR.
Figure 2:
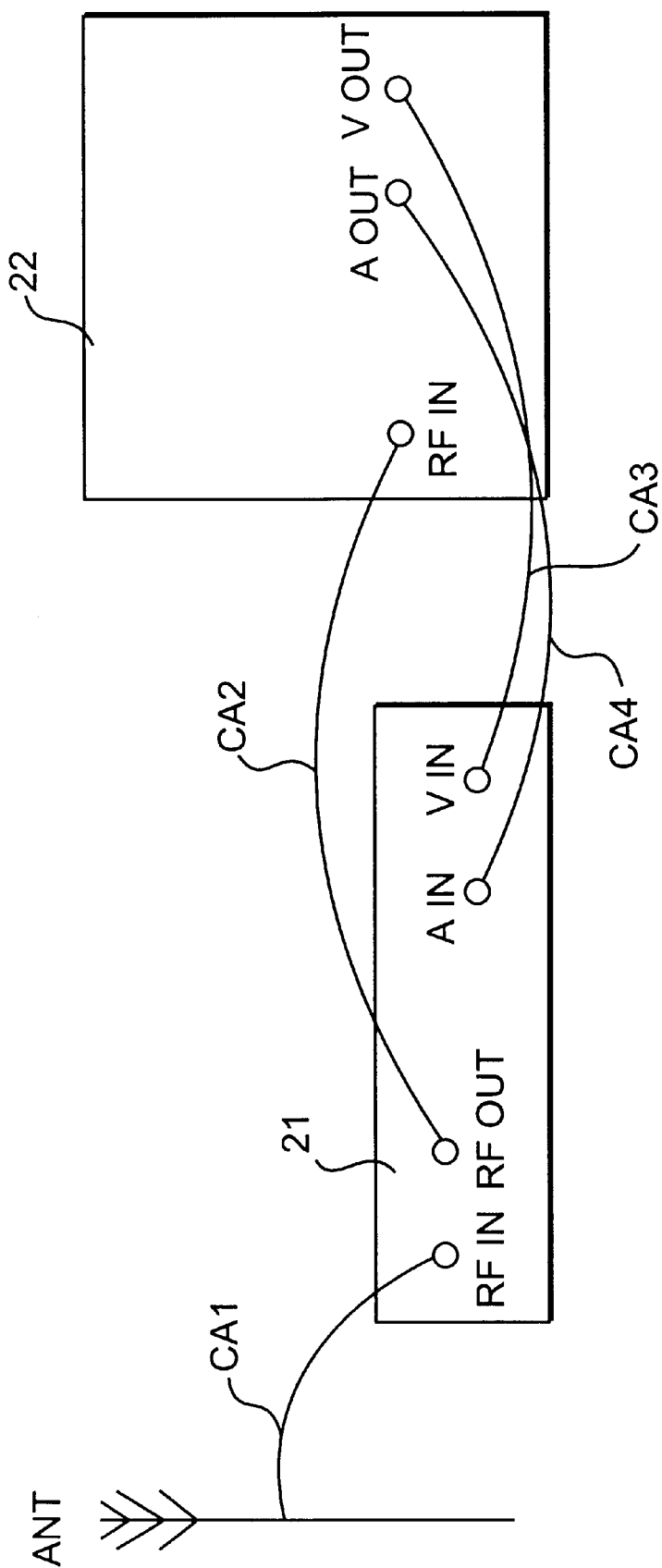
FIG. 2 is a signal line circuit connecting the TV set to the VCR according to the present invention.

Referring to FIG. 2, a broadcast signal inputted through the antenna ANT is sent to broadcast signal input terminal $RF_{in}$ of the VCR 21, through a cable $CA_1$. The broadcasting signal outputted from the broadcast output terminal $RF_{out}$ of the VCR 21 is sent to the broadcast input terminal $RF_{in}$ of the TV set 22 through the cable $CA_2$. The TV set 22 and the VCR 21 are inter-connected so that the visual and audio line signals outputted from the line signal output terminals $V_{out}$, $A_{out}$ of the TV set 22 are sent to the visual and audio line signal input terminals $V_{in}$, $A_{in}$ of the VCR 21 through the cables $CA_3$, $CA_4$.

Figure 3:
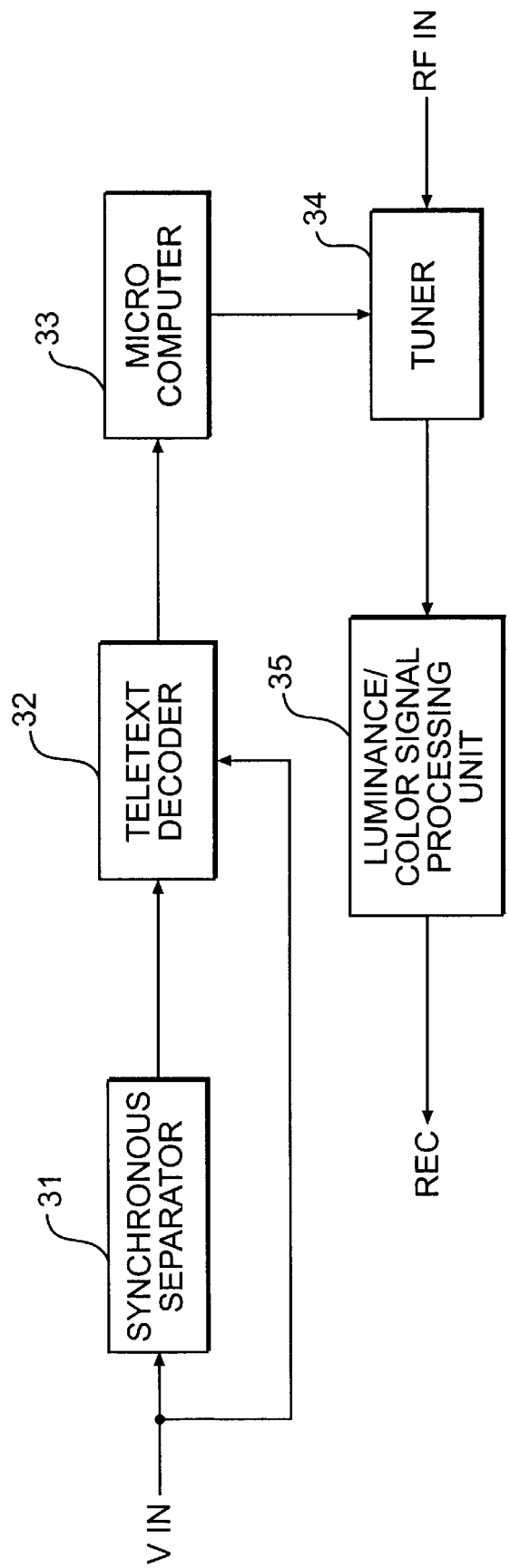
FIG. 3 is a block diagram of the immediate recording device of the VCR according to the first embodiment of the present invention.

FIG. 3 is a block diagram of the first embodiment according to the present invention. A synchronous separator 31 detects the visual signal which is inputted to the visual line signal input terminal $V_{in}$ by recognizing the operation of the VCR recording key, and separates a synchronous signal from the detected visual signal. A teletext decoder 32 detects the broadcast source from the visual signal in accordance with the timing of the synchronous separator 31. Recognizing the channel to which the TV set 22 is tuned by the detected broadcast source, the microcomputer 33 outputs the tuning data and controls the deck system of the VCR to record the broadcast signal. The tuner 34 selects the channel corresponding to that of the VCR from the broadcast signal $RF_{in}$ received by way of antenna ANT by the tuning data received from the microcomputer 33. A luminance/color signal processing unit 35 processes luminance and color signals of the intermediate frequency signal received from the tuner 34.

As shown in FIG. 2, the broadcast signal received by way of the antenna ANT is sent to the broadcast signal input terminal $RF_{in}$ of the VCR 21 through the cable $CA_1$ and is then sent the TV set 22 through the terminal Rfout and the cable $CA_2$.

When the VCR 21 is turned off, the user can watch a TV program by operating a remote controller or the power key and the channel key attached the TV set 22. When the recording key of VCR 21 is operated to immediately record a TV program while watching that TV program, the microcomputer 33 recognizes the operation of the recording key. At that time, the broadcast signal of the selected channel to which the TV set 22 is tuned is sent to the line signal input terminals $V_{in}$, $A_{in}$ of the VCR 21 from the line signal output terminals $V_{out}$, $A_{out}$ of the TV set 22 through the cables $CA_3$, $CA_4$.

The broadcast signal sent to the line signal input terminals $V_{in}$, $A_{in}$, of which the synchronous signal is separated by the synchronous separator 31, is sent to the teletext decoder 32. In the teletext decoder 32, the broadcast source which is carried on the vertical blanking interval is detected and passed to the microcomputer 33.

In general, the broadcast source carried on the visual signal includes various broadcasting data. The broadcast data is displayed on the TV set. This broadcasting system is called, for example, Korean broadcasting program system (KBPS) in Korea, and video program system (VPS) in Europe.

The microcomputer 33 recognizes the selected channel of the TV set according to the broadcast source and outputs the tuning data to the tuner 34 of the VCR 21, thereby changing the channel of the VCR 21 to the selected channel of the TV set. Further, the broadcast signal selected by the tuner 34 is processed in the appropriate form so that the luminance and color signals can be easily recorded by the luminance/color signal processing unit 35 and then be sent to the recording unit. At the same time, the microcomputer 33 controls the VCR deck system so that the broadcast signal is recorded onto a recording medium such as a magnetic tape, through a head of the VCR 21. In this embodiment, the processing of the audio signal is the same as the conventional process.

In the aforementioned embodiment, the TV program that the user is watching is immediately recorded onto the recording medium of the VCR, and the signal is processed faster than the loading time of the cassette tape in the deck system. Thus, when the recording order is inputted, the broadcast signal is recorded simultaneously with loading of the tape.

Figure 4:
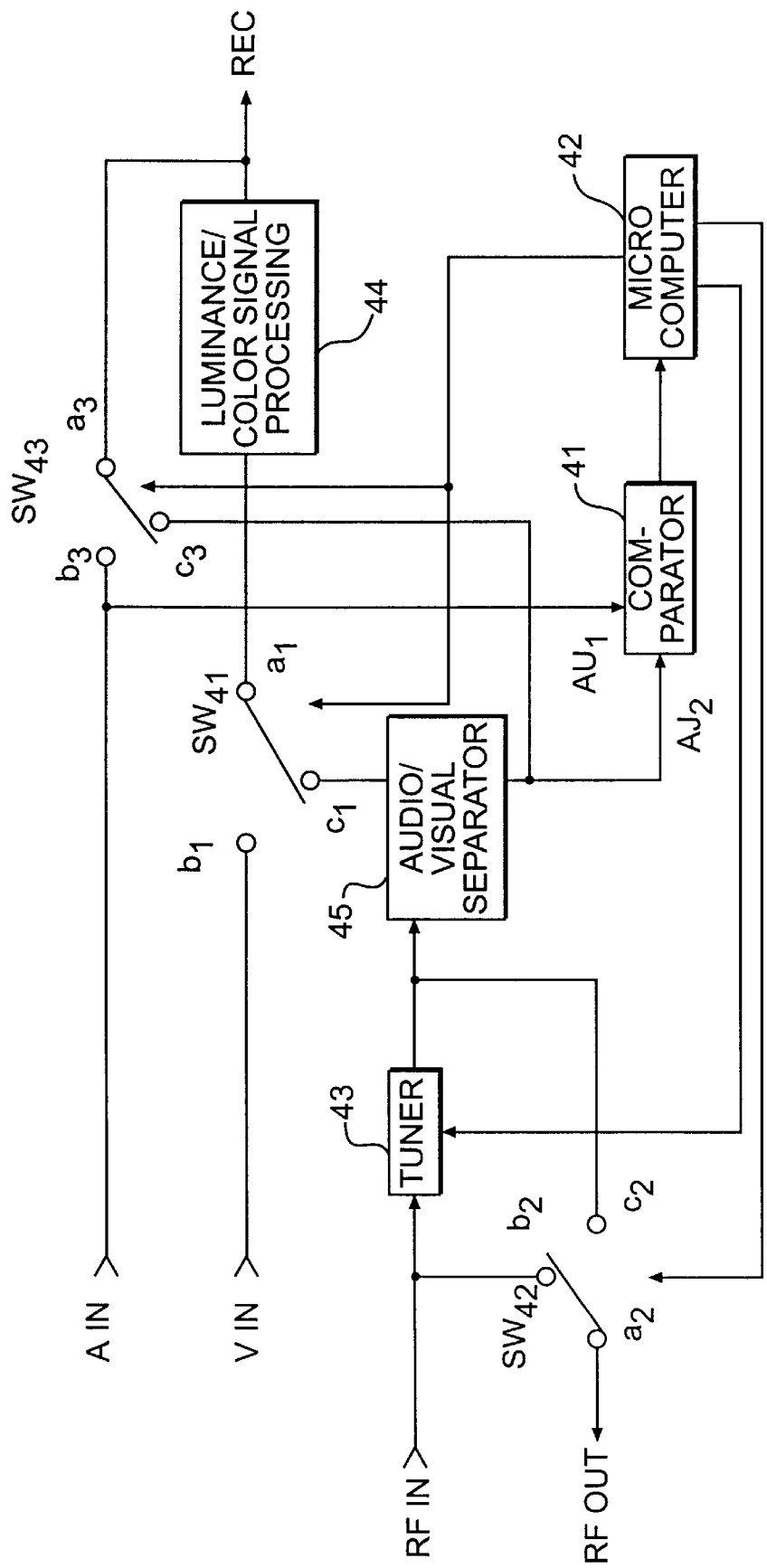
FIG. 4 is a block diagram of the immediate recording device of the VCR according to the second embodiment of the present invention.
Figure 5:
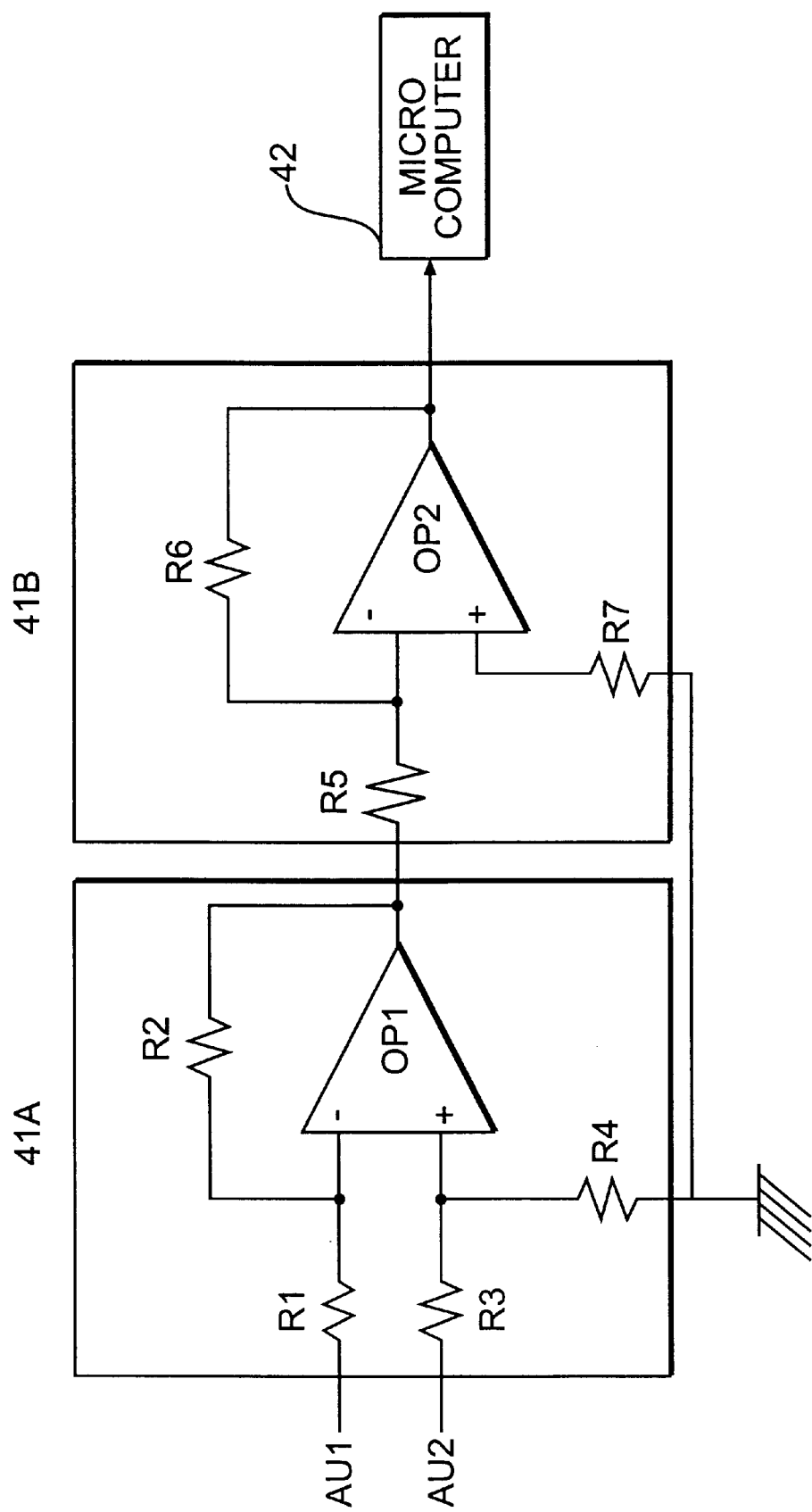
FIG. 5 is a circuit of the comparator of FIG. 4
Figure 6:
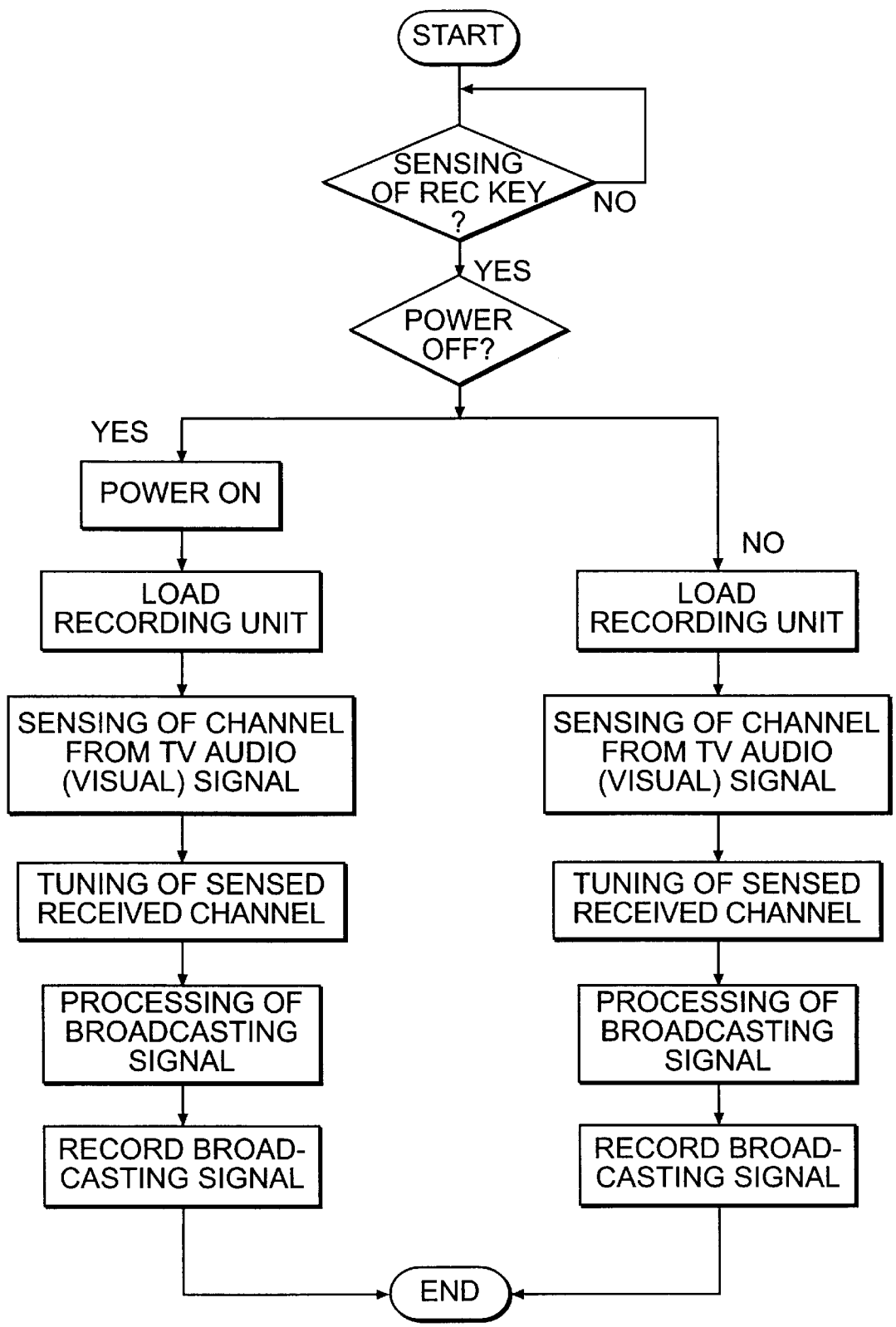
FIG. 6 is a flow chart according to the present invention.

FIG. 4 is a block diagram of an immediate recording device in a VCR in a second embodiment according to the present invention. The broadcast signal inputted from the tuner 43 of the VCR 21 is compared with the broadcast signal inputted from the TV set 22 in the comparator 41. A comparison-judgement signal is outputted from the comparator 41 and sent to the microcomputer 42. The signal inputted from the tuner 43 is also separated into visual and audio signals in a visual/audio separation unit 45. The microcomputer 42 controls the tuner 43 (in which the broadcast signal inputted from antenna is tuned) and the deck system according to the comparison-judgement signal to match the channel of the VCR with the channel of the TV set. The switch $SW_4$, selects one signal from among the broadcast signals inputted from the TV set and the tuner 43, and the processing unit 44 processes the visual signal in the appropriate form so that the luminance and color signals can be easily recorded to the recording media. The $SW_{42}$ selects one signal from among the broadcast signal inputted through the antenna and the broadcast signal inputted from tuner 43, and sends the selected one signal to the TV set.

As shown in FIG. 4, when the recording key of the remote controller is operated to record the TV program immediately while watching the TV set, the broadcast signal of the selected channel of the TV set is sent to the line signal input terminals $V_{in}$, $A_{in}$ of the VCR from the line signal output terminals $V_{out}$, $A_{out}$ of the TV set 22, through the cables $CA_3$, $CA_4$. Therefore, the microcomputer 42 outputs a switch controlling signal to the switches $SW_{41}$, $SW_{42}$ so that the switches are converted to fixed terminals $b_1$, $b_2$, respectively.

At that time, the audio signal $AU_1$ inputted to the line signal input terminal $A_{in}$ is sent to one terminal of the comparator 41, while the audio signal $AU_2$ of the channel to which the tuner 43 of the VCR 21 is tuned is sent to other terminal of the comparator 41. When two audio signals inputted to the comparator 41 have different wavelengths from each other, a high signal is outputted from the differential amplifier 41A and sent to the microcomputer 42 through the hysteresis amplifier 41B (see FIG. 5).

The microcomputer 42 varies the tuning data inputted from the tuner 43 and compares the audio signal $AU_2$ of the selected channel with the audio signal AU. The tuning and the comparing process is repeated until the audio signal $AU_2$ coincides with the audio signal $AU_1$ (that is, the channel to which the tuner 43 of the VCR 21 is tuned coincides with the channel to which the tuner of the TV set is tuned. At that time, the low signal is sent to the microcomputer 42 from the comparator 41.

According to the low signal inputted to the microcomputer 42, the operation of the tuner 43 is stopped by the microcomputer 42. A switch controlling signal is sent to the switch $SW_{41}$ to switch the moving terminal $a_1$ to the fixed terminal $C_1$, so that the broadcast signal outputted from the tuner 43 is sent to the recording unit through the switch $SW_{41}$ and to the luminance/color signal processing unit 44.

At that time, because the TV set is in the TV mode, i.e., the moving terminal $a_2$ of the switch $SW_{42}$ is switched to the fixed terminal $b_2$, so a channel different from the channel being recording can be selected and viewed.

In the above mentioned immediate recording device, the microcomputer of the VCR detects the broadcast signal of the channel selected in the TV set by detecting the broadcast source and comparing it with the received broadcast signals and operates the deck system of the VCR to record the broadcast signal of from the selected channel. Therefore, the desired TV program can be recorded easily and immediately. In addition, since a TV channel different from the channel being recorded in the VCR can be selected, the user can watch another TV program while a first TV program is recording.

While the preferred embodiment of the present invention has been described, it is to be understood that modifications will be apparent to those skilled in the art without departing from the spirit of the invention.

The scope of the invention, therefore, is to be determined solely by the following claims.

What is claimed is:

1. In a video cassette recorder (VCR) comprising a recording unit and a VCR tuner having an RF terminal, a signal processing device for permitting immediate recording of a broadcast signal comprising:

a switching system constructed and arranged to selectively connect the recording unit to one of:
the RF terminal for recording a broadcast signal inputted from the VCR tuner, and
an AV line terminal connected to a television for recording a broadcast signal inputted from a television via an AV line;

a synchronous signal separator constructed and arranged to separate a synchronous signal from a video signal inputted to the VCR from a television;

a teletext decoder constructed and arranged to extract broadcasting station identification data from a vertical blanking interval of said video signal;

a microcomputer constructed and arranged to recognize a channel to which the television is tuned based on said extracted broadcasting station identification data and to output tuning data corresponding to said recognized television channel and a control signal for controlling a recording operation of the VCR; and a tuner constructed and arranged to a select a VCR channel matching said recognized television channel based on said tuning data received from said microcomputer.

2. A signal processing device according to claim 1, further comprising a luminance/color processing unit constructed and arranged to process color and luminance components of a signal outputted from said tuner thereby placing said signal in condition for recording.

3. In a video cassette recorder (VCR) connected to a television, a signal processing device comprising:

a tuner constructed and arranged to be tuned to a first signal from an external signal source;

an audio/video signal separating unit constructed and arranged to separate and output audio and video signal components of said first signal;

a comparator constructed and arranged to compare said first signal with a second signal from the television and to output a comparison-judgement signal based on said comparison, said second signal comprising video and audio signal components, said comparator comprising:

a difference amplifying unit constructed and arranged to receive and amplify audio signal components from said first and second signal sources, respectively, and to output an amplified signal; and a hysteresis amplifying unit constructed and arranged to amplify said amplified signal outputted from said difference amplifying unit and to output said comparison-judgement signal;

a switching device constructed and arranged to select one of said first and second signals for output to the television; and a microcomputer constructed and arranged to control said tuner and said switching device in accordance with said comparison-judgement signal from said comparator.

4. A signal processing device according to claim 3, further comprising a luminance/color processing unit constructed and arranged to process luminance and color characteristics of said video signal component either of said first and second signals, and to output a recordable video signal component.

5. A signal processing unit according to claim 4, comprising a switch for selectively connecting an input of said luminance/colorprocessing unit with one of said visual signal component of said first signal outputted by said visual/audio signal separating unit and said visual signal component of said second signal.

6. A signal processing unit according to claim 4, comprising a switch for selectively connecting an output of said luminance/color processing unit with one of an audio signal component of said first signal outputted by said visual/audio signal separating unit and an audio signal component of said second signal, whereby said recordable visual signal component and said one audio signal component are combined so as to obtain a recordable visual/audio signal.

7. A signal processing unit according to claim 5, wherein said microcomputer is constructed and arranged to output a control signal for controlling said switch.

8. A signal processing unit according to claim 6, wherein said microcomputer is constructed and arranged to output a control signal for controlling said switch.

9. A method for immediately recording a broadcast signal with a video cassette recorder (VCR) that includes a tuner and a recording unit, comprising the steps of:

receiving a video signal from a television via an AV line;

separating a synchronous signal from the video signal;

extracting broadcasting station identification data from the video signal;

outputting tuning data corresponding to the extracted broadcasting station identification data;

tuning the VCR to the same channel to which the television is tuned;

switching a connection with the recording unit from the AV line to the tuner to connect the recording unit with the tuner;

controlling the recording unit to perform a recording operation; and recording a signal corresponding to the channel to which the VCR is tuned.

10. A method for recording according to claim 9, further comprising a step of processing luminance and color characteristics of the signal corresponding to said channel to which the VCR is tuned, prior to said step of recording.

11. A method for recording according to claim 9, wherein said extracting step comprises the steps of:

separating a synchronous signal from the signal from the television; and detecting broadcast source data carried on the signal from the television on which basis the channel to which the television is tuned is recognized.

* * * * *